United States Patent [19]

Hopper et al.

[11] Patent Number: 5,714,523
[45] Date of Patent: Feb. 3, 1998

[54] PROCESS FOR HYDROLYSING POLYURETHANE DEGRADATION PRODUCTS

[75] Inventors: Julian Francis George Hopper, Middlesbrough, United Kingdom; Patrick Margriet Gaston Goegebeur, Zedelgem, Belgium; Harry Kooren, Rozenburg, Netherlands

[73] Assignee: Imperial Chemical Industries PLC, London, England

[21] Appl. No.: 785,112

[22] Filed: Jan. 21, 1997

[30] Foreign Application Priority Data

Jan. 25, 1996 [EP] European Pat. Off. .............. 96101035

[51] Int. Cl.⁶ .................................................. C08J 11/04
[52] U.S. Cl. ........................... 521/49.5; 521/49; 568/621
[58] Field of Search ...................... 521/49, 49.5; 568/621

[56] References Cited

U.S. PATENT DOCUMENTS 4,317,939 3/1982 Gerlock et al. ..................... 568/121

FOREIGN PATENT DOCUMENTS 9510562 4/1995 WIPO.

Primary Examiner—Morton Foelak

[57] ABSTRACT

Process for alcoholizing and hydrolysing a flexible polyurethane foam by bringing a flexible polyurethane foam in contact with an alcoholizing polyol, allowing the foam and the polyol to react in the presence of a catalyst which enhances alcoholysis and hydrolysis of the foam in an amount of 0.001 to 0.25 and preferably 0.001 to 0.08% by weight based on the weight of the foam, then allowing the mixture to separate in an upper phase and a lower phase and collecting these phases in separate containers, wherein the hydrolysis is conducted by adding water and allowing the mixture to react with the water after the foam has been combined with the polyol and before the mixture is allowed to separate.

9 Claims, No Drawings

PROCESS FOR HYDROLYSING POLYURETHANE DEGRADATION PRODUCTS

The present invention is concerned with a process for hydrolysing a mixture comprising hydrolysable flexible polyurethane foam degradation products.

In PCT/EP94/03283 a process is described wherein a flexible foam is glycolysed so as to form an upper layer and a lower layer. The upper layer contains the high molecular weight polyol which was used to prepare the foam; this polyol may be reused to prepare flexible polyurethane foams. The lower layer may be used for making e.g. rigid polyurethane foam after alkoxylation.

The glycolysis may be conducted in the presence of up to 5% by weight of water calculated on the weight of foam and glycolysing polyol.

U.S. Pat. No. 4,316,992 and U.S. Pat. No. 4,317,939 disclose the hydrolysis using steam or water. The amount of catalyst is relatively high. The amount of polyol which may be reused to replace freshly prepared polyol is limited.

Surprisingly it has been found that a limited amount of catalyst may be used for alcoholizing and hydrolysing the foam. The amount of polyol which may be reused to replace freshly prepared polyol may be up to 100%.

Further it has been found that the process and the quality of the upper layer may be further improved by first alcoholizing the foam, then allowing the mixture obtained to separate in an upper phase and a lower phase and collecting the lower phase which subsequently is subjected to hydrolysis. This process avoids the need to remove any remaining water before the upper phase is subjected to further purification and the amount of hydrolysis products contaminating the upper phase is reduced.

Therefore the present invention is concerned with a process for alcoholizing and hydrolysing a flexible polyurethane foam by bringing a flexible polyurethane foam in contact with an alcoholizing polyol, allowing the foam and the polyol to react in the presence of a catalyst which enhances alcoholysis and hydrolysis of the foam in an amount of 0.001 to 0.25 and preferably 0.001 to 0.08% by weight based on the weight of the foam, then allowing the mixture to separate in an upper phase and a lower phase and collecting these phases in separate containers, wherein the hydrolysis is conducted by adding water and allowing the mixture to react with the water after the foam has been combined with the polyol and before the mixture is allowed to separate.

Further the present invention is concerned with a process for hydrolysing a hydrolysable composition, which is obtained by 1) alcoholizing a flexible polyurethane foam by bringing the foam in contact with an alcoholizing polyol, preferably selected from glycerol and an oxyethylene polyol having a molecular weight of 62–500 and mixtures thereof, 2) allowing the foam and the polyol to react, 3) then allowing the mixture to separate in an upper and a lower phase and 4) collecting the lower phase, wherein this lower phase, optionally after it has been subjected to purification as to reduce the amount of alcoholizing polyol, is subjected to hydrolysis by reacting it with water in the presence of a catalyst, which enhances the hydrolysis process, in an amount of 0.001 to 5% by weight, preferably of 0.001 to 0.25% by weight and most preferably of 0.001 to 0.08% by weight based on the weight of the lower phase.

Still further the present invention is concerned with a process for recycling flexible polyurethane foams by 1) alcoholizing a flexible polyurethane foam by bringing the foam in contact with an alcoholizing polyol, preferably selected from glycerol and an oxyethylene polyol having a molecular weight of 62–500 and mixtures thereof, allowing the foam and the polyol to react in the presence of a catalyst, which enhances the alcoholysis process and the later hydrolysis process, in an amount of 0.001 to 5% by weight, preferably of 0.001 to 0.25% by weight and most preferably of 0.001 to 0.08% by weight based on the weight of the foam, then allowing the mixture to separate in an upper and a lower phase and subsequently collecting the lower phase and 2) hydrolysing this lower phase by reacting it with water, optionally after it has been subjected to purification so as to reduce the amount of alcoholizing polyol.

The hydrolysed products so obtained may be purified so as to reduce the content of alcoholizing polyol and be alkoxylated. The present invention is also concerned with this process and with the products obtained by the above processes and with the use of the alkoxylated products in the preparation of rigid foams.

In the context of the present invention the following terms have the following meaning:

1) isocyanate index or NCO index or index: the ratio of the number of NCO-groups over the number of isocyanate-reactive hydrogen atoms present in a formulation, given as a percentage:

$$\frac{[NCO] \times 100 \, (\%)}{[\text{active hydrogen}]}.$$

In other words the NCO-index expresses the percentage of isocyanate actually added to a formulation with respect to the amount of isocyanate theoretically required for reacting with the amount of isocyanate-reactive hydrogen used in a formulation.

It should be observed that the isocyanate index as used herein is considered from the point of view of the actual foaming process involving the isocyanate ingredient and the isocyanate-reactive ingredients. Any isocyanate groups consumed in a preliminary step to produce modified polyisocyanates (including such isocyanate-derivatives referred to in the art as quasi or semi-prepolymers and prepolymers) or any active hydrogens reacted with isocyanate to produce modified polyols or polyamines, are not taken into account in the calculation of the isocyanate index. Only the free isocyanate groups and the free isocyanate-reactive hydrogens (including those of the water, if used) present at the actual foaming stage are taken into account.

2) The expression "isocyanate-reactive hydrogen atoms" as used herein for the purpose of calculating the isocyanate index refers to the total of hydroxyl and amine hydrogen atoms present in the reactive compositions in the form of polyols, polyamines and/or water; this means that for the purpose of calculating the isocyanate index at the actual foaming process one hydroxyl group is considered to comprise one reactive hydrogen, one primary amine group is considered to comprise one reactive hydrogen and one water molecule is considered to comprise two active hydrogens.

3) Reaction system: a combination of components wherein the polyisocyanate component is kept in a container separate from the isocyanate-reactive components.

4) The expression "polyurethane foam" as used herein generally refers to cellular products as obtained by reacting polyisocyanates with isocyanate-reactive hydrogen containing compounds, using foaming agents, and in particular includes cellular products obtained with water as reactive foaming agent (involving a reaction of water with isocyanate groups yielding urea linkages and carbon dioxide and producing polyurea-urethane foams).

5) The term "(average nominal) hydroxyl functionality" is used herein to indicate the average functionality (number of hydroxyl groups per molecule) of the polyol composition on the assumption that this is the average functionality (number of active hydrogen atoms per molecule) of the initiator(s) used in their preparation although in practice it will often be somewhat less because of some terminal unsaturation.

6) The term "high molecular weight polyol" refers to polyols preferably polyether polyols, most preferably polyoxyethylene polyols, polyoxypropylene polyols and polyoxyethylene polyoxypropylene polyols, which polyols have an average nominal hydroxyl functionality of 2–6 and a number average equivalent weight of 500–5000.

7) The term "alcoholizing polyol" refers to those polyols which are able to alcoholize flexible polyurethane foams and which are immiscible with the high molecular weight polyol obtained in the alcoholysis process; wherein immiscible means that at most 30%, preferably at most 20% by weight of alcoholizing polyol can be dissolved in the high molecular weight polyol at room temperature.

8) The term "average" refers to "number average" unless stated otherwise.

9) The term "gradual addition of water" refers to a way of addition wherein there is an extended period of time (at least 1 hour) between the beginning of the addition and the end of the addition of the water. Such a gradual addition may be conducted by adding the water at a constant rate, a decreasing rate, an increasing rate, portion-wise and combinations thereof.

The flexible polyurethane foam starting material is a foam made by reacting a polyisocyanate and a polyol having a high molecular weight using a blowing agent and optionally a chain extender or cross-linker and additives conventionally used in preparing flexible polyurethane foams. Such foams, ingredients used for preparing the foams and processes for preparing such foams have been described extensively in the art, see e.g. European Patent Publications 10850, 22617, 296449, 309217, 309218, 392788, 442631 and 480588. Organic polyisocyanates used for making such flexible foams may be selected from aliphatic, cycloaliphatic and araliphatic polyisocyanates, especially diisocyanates, like hexamethylene diisocyanate, isophorone diisocyanate, cyclohexane-1,4-diisocyanate, 4,4'-dicyclohexylmethane diisocyanate and m- and p- tetramethylxylylene diisocyanate, and in particular aromatic polyisocyanates like toluene diisocyanates (TDI), phenylene diisocyanates and most preferably methylene diphenyl isocyanates having an isocyanate functionality of at least two and mixtures thereof. The methylene diphenyl isocyanates (MDI) may be selected from pure 4,4'-MDI, isomeric mixtures of 4,4'-MDI and 2,4'-MDI and less than 10% by weight of 2,2'-MDI, crude and polymeric MDI having isocyanate functionalities above 2, and modified variants thereof containing carbodiimide, uretonimine, isocyanurate, urethane, allophanate, urea or biuret groups. Most preferred methylene diphenyl isocyanates are pure 4,4'-MDI, isomeric mixtures with 2,4'-MDI optionally containing up to 50% by weight of polymeric MDI and uretonimine and/or carbodiimide modified MDI having an NCO content of at least 25% by weight and urethane modified MDI obtained by reacting excess MDI and a low molecular weight polyol (MW less than 999) and having an NCO content of at least 25% by weight. Mixtures of methylene diphenyl isocyanates with up to 25% by weight of other polyisocyanates mentioned above may be used if desired. The polyisocyanate may contain dispersed urea particles and/or urethane particles prepared in a conventional way, e.g. by adding a minor amount of an isophorone diamine to the polyisocyanate. The high molecular weight polyols used for preparing such flexible foams may be selected from polyesters, polyesteramides, polythioethers, polycarbonates, polyacetals, polyolefins, polysiloxanes and, especially, polyethers. Polyether polyols which may be used include products obtained by the polymerisation of a cyclic oxide, for example ethylene oxide, propylene oxide, butylene oxide or tetrahydrofuran in the presence, where necessary, of polyfunctional initiators. Suitable initiator compounds contain a plurality of active hydrogen atoms and include water, butanediol, ethylene glycol, propylene glycol, diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol, sorbitol and sucrose. Mixtures of initiators and/or cyclic oxides may be used. Especially useful polyether polyols include polyoxypropylene diols and triols and poly(oxyethylene-oxypropylene) diols and triols obtained by the simultaneous or sequential addition of ethylene and propylene oxides - to di- or trifunctional initiators as fully described in the prior art. Random copolymers having oxyethylene contents of 10–80%, block copolymers having oxyethylene contents of up to 25% and random/block copolymers having oxyethylene contents of up to 50%, based on the total weight of oxyalkylene units may be mentioned, in particular those having at least part of the oxyethylene groups at the end of the polymer chain. Mixtures of the said diols and triols can be particularly useful. Other particularly useful polyether polyols include polytetramethylene glycols obtained by the polymerisation of tetrahydrofuran. Polyester polyols which may be used include hydroxyl-terminated reaction products of polyhydric alcohols such as ethylene glycol, propylene glycol, diethylene glycol, 1,4-butanediol, neopentyl glycol, 1,6-hexanediol, cyclohexane dimethanol, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof. Polyesters obtained by the polymerisation of lactones, for example caprolactone, in conjunction with a polyol, or of hydroxy carboxylic acids such as hydroxy caproic acid, may also be used. Polyesteramides may be obtained by the inclusion of aminoalcohols such as ethanolamine in polyesterification mixtures. Polythioether polyols which may be used include products obtained by condensing thiodiglycol either alone or with other glycols, alkylene oxides, dicarboxylic acids, formaldehyde, amino-alcohols or aminocarboxylic acids. Polycarbonate polyols which may be used include products obtained by reacting diols such as 1,3-propanediol, 1,4-butanediol, 1,6-hexanediol, diethylene glycol or tetraethylene glycol with diaryl carbonates, for examples diphenyl carbonate, or with phosgene. Polyacetal polyols which may be used include those prepared by reacting glycols such as diethylene glycol, triethylene glycol or hexanediol with formaldehyde. Suitable polyacetals may also be prepared by polymerising cyclic acetals. Suitable polyolefin polyols include hydroxy-terminated butadiene homo- and copolymers and suitable polysiloxane polyols include polydimethylsiloxane diols and triols. The number average equivalent weight of the high molecular weight polyols preferably is 750–3000; the average nominal hydroxyl functionality preferably is 2–4; the hydroxyl value preferably ranges from 15–200 and most preferably from 18–100. The chain-extending and cross-linking agents which optionally may be used in preparing such foams may be selected from amines and polyols containing 2–8 and preferably 2–4 amine and/or hydroxy groups like ethanolamine, diethanolamine, triethanolamine, ethylene glycol, diethylene glycol, triethylene glycol, propylene glycol, dipropylene glycol, butanediol, glycerol, trimethylolpropane, pentaerithrithol, sorbitol, sucrose, polyethylene glycol having an equivalent weight of less than 500, toluene diamine, diethyl toluene diamine, cyclohexane diamine, phenyl diamine, diphenylmethane diamine, an alkylated diphenylmethane diamine and ethylene diamine. The amount of chain-extending and cross-linking agents is, if applied, up to 25 and preferably up to 10 parts by weight per 100 parts by weight of the high molecular weight polyol. The blowing agent may be selected from physical blowing agents like chlorofluorocarbons, hydrogen chlorofluorocarbons, hydrogen fluorocarbons and preferably from chemical blowing agents, especially those which lead to $CO_2$ liberation when reacted with the polyisocyanate under foam forming conditions. Most preferably water is used as the sole blowing agent. The amount of water may range from 2–20 preferably from 3–15 parts by weight per 100 parts by weight of isocyanate-reactive compound having a number average equivalent weight of 500 to 5000. The blowing may also be conducted by using an inert gas like $N_2$ or $CO_2$ or by using a reduced or variable pressure. The auxiliaries and additives which amongst others may be used are formation of urea and urethane enhancing catalysts like tertiary amines, imidazoles and tin compounds, surfactants, stabilisers, flame retardants, fillers and antioxidants. They may be premixed with the isocyanate-reactive materials before these materials are reacted with the polyisocyanate in order to prepare the foams. The foams may be made according to the one-shot process, the semi- or quasi prepolymer process or the prepolymer process. The foams may be slab-stock or moulded flexible foams. The foams in general have a density of 10–150 kg/m³ and may have been used as cushioning material in furniture, car-seats and mattresses for instance.

Although in principle any such flexible polyurethane foam may be used, MDI-based, polyether polyol-based, fully water blown flexible polyurethane foams are particularly preferred.

The flexible foam may be combined with the alcoholizing polyol in the form in which it is received but preferably the size of the foam pieces is reduced, if necessary, in a way suitable for reducing the size and/or for increasing the density of foam pieces, like by cutting, milling, pelletizing, grinding, comminution, densification and pressing and combinations thereof. Although the success of the process does not greatly depend on the size of the foam pieces it is for efficiency and handling reasons preferred to have pieces having an average diameter between 0.1 mm and 10 cm.

The alcoholizing polyol preferably is selected from glycerol and an oxyethylene polyol having a molecular weight of 62–500 which may have a hydroxyl functionality of 2–8, and may be selected from ethylene glycol and polyols prepared by reacting ethylene oxide with an initiator having a hydroxyl functionality of 2–8 like ethylene glycol, glycerol, trimethylol propane, pentaerythritol, sorbitol and sucrose. Preferably the hydroxyl functionality is 2. Most preferably the alcoholizing polyol is ethylene glycol or diethylene glycol or a mixture thereof.

The foam or foam pieces and the alcoholizing polyol are combined, suitably by normal mixing in a container suitable to conduct a alcoholysis reaction process. The alcoholysis reaction conditions are chosen in such a way that the alcoholysis reaction reaches equilibrium in a reasonable period of time. Generally the pressure applied ranges from ambient pressure to 10 bar, preferably from ambient pressure to 5 bar and most preferably the process is conducted at ambient pressure, and the reaction temperature ranges from 170° to 240° C., preferably from 180° to 220° C. and the reaction time from 0.5 to 8 hours, preferably from 1 to 6 hours. The reaction preferably is conducted while stirring and under a $N_2$ blanket. The relative amounts of the foam and the alcoholizing polyol generally will range from 0.1 to 10 parts by weight (pbw) of polyol per pbw of foam and preferably from 0.5 to 5 pbw. If desired other reactive ingredients like alkanol amines may be present in an amount of up to 5% by weight on foam and polyol. If the hydrolysis is conducted before allowing the mixture to separate in an upper phase and a lower phase water is added and the mixture is allowed to hydrolyse before the mixture is allowed to separate. The foam or foam pellets may be added to a mixture of the alcoholizing polyol and the water and the process is conducted under the above conditions. Alternatively the water may be added after the foam and the alcoholizing polyol have been combined. Although higher amounts of water may be used, the amount of water needed in order to complete the hydrolysis process ranges from 0.5 to 15% by weight and preferably from 1 to 12% by weight calculated on the amount of foam and alcoholizing polyol. Preferably the water is added gradually within the above mentioned reaction time period. If hydrolysis is conducted before allowing the mixture to separate a catalyst is used which enhances the alcoholysis process and the hydrolysis process in an amount of 0.001 to 0.25 and preferably of 0.001 to 0.08% by weight based on the weight of the foam. Preferred catalysts may be selected from metal hydroxides like LiOH, NaOH, CsOH and KOH which is the most preferred one.

If the hydrolysis is conducted after the separation of the upper layer and the lower layer the hydrolysis is conducted in the presence of 0.001 to 5% by weight of a catalyst which enhances the alcoholysis and preferably also the hydrolysis which is to be conducted later; preferably the amount of catalyst is 0.001 to 0.25% by weight and most preferably 0.001 to 0.08% by weight, all based on the weight of the foam. Preferred catalysts may be from metal hydroxide like LiOH, NaOH, CsOH and KOH which is the most preferred one. If hydrolysis is conducted after separation, no water is added to the alcoholizing mixture; the foam and the alcoholizing polyol could, however, contain a minor amount of residual water due to moisture attraction.

After alcoholysis mixing is stopped and the mixture is left for a period sufficient to allow the mixture to separate in two phases. Generally a period ranging from 1 minute to 24 hours will be sufficient. Preferably this period is 5 minutes to 4 hours.

After stirring has been discontinued the temperature may be maintained while the phases are allowed to separate and when the phases are collected. Alternatively the temperature may be reduced by cooling or by no longer supplying heat after stirring has been discontinued or after phase separation but before collecting the phases.

The upper phase predominantly comprises the high molecular weight polyol from which the foam was made and the lower phase predominantly comprises the other chemicals obtained together with the alcoholizing polyol.

Both products are then collected separately in a conventional way, e.g. by decanting the upper phase or by removing the lower phase via an outlet in the bottom of the container. Sometimes an interface may be present after phase separation between the upper and the lower phase, which interface may be collected separately or together with either of the two phases. The upper phase may be subjected to one or more washing steps with a polyol used for alcoholysis, e.g. with ethylene glycol or diethylene glycol; the lower phase(s) after such washing step(s) may be used in the glycolysis and/or hydrolysis process according to the present invention.

If hydrolysis is conducted after separation of the upper phase and the lower phase, the hydrolysis is conducted by adding water to the collected lower phase, optionally after purification of the lower phase in order to lower the content of alcoholizing polyol (e.g. by evaporation or distillation).

The addition of the water may be started at any stage after the lower phase has been collected. Preferably water addition is started after the lower phase has been brought to a temperature of 170° to 240° C. Preferably the addition of the water is conducted gradually. The gradual addition of the water is continued for more than 1 hour after the gradual addition started and most preferably for 2 to 15 hours after the gradual addition started. Subsequently the reacting mixture may be allowed to react further; e.g. for another 1–10 hours. Although higher amounts may be used, the amount of water needed in order to complete the hydrolysis process ranges from 0.5 to 15% by weight and preferably from 1 to 12% by weight, calculated on the amount of lower phase. The hydrolysis is conducted in the presence of a suitable hydrolysis promoting catalyst. The catalyst may be added to the lower phase before the hydrolysis is started. Preferably one catalyst is used which enhances the alcoholysis as well as the hydrolysis; such a catalyst is added at the start of the alcoholysis process in an amount of from 0.001 to 5% by weight, preferably of from 0.001 to 0.25 and most preferably from 0.001 to 0.08% by weight calculated on the weight of foam. After alcoholysis and separation of the upper and lower phase a certain amount of this catalyst will be present in this lower phase, hydrolysis may then be started by adding water. The hydrolysis should take place in the presence of 0.001 to 5% by weight and preferably of 0.001 to 0.25% by weight and most preferably of 0.001 to 0.08% by weight of catalyst calculated on the weight of the lower phase. If the amount of catalyst already present in the lower phase is below the lower limit, additional catalyst may be added; in most cases such an extra addition of catalyst is not necessary. Preferred catalysts may be selected from metal hydroxides like LiOH, KOH, NaOH and CsOH. KOH is the most preferred catalyst.

The alcoholysis and hydrolysis preferably are conducted in a non-oxidising atmosphere, like under a $N_2$ or $CO_2$ blanket.

The hydrolysed mixture which predominantly comprises the alcoholizing polyol and amines which reflect the polyisocyanates used in preparing the flexible foams (NCO groups in the polyisocyanate have been converted to amine groups) may be subjected to purification e.g. evaporation or distillation in order to remove the alcoholizing polyol; this purification step may also be applied to the lower phase before it has been hydrolysed. Then the purified product may be subjected to alkoxylation which preferably is a propoxylation and which may be conducted in a conventional way and is continued until the alkoxylated product has an hydroxyl value of 250 to 600 mg KOH/g.

If no such catalyst was used during the alcoholysis process, a catalyst promoting the hydrolysis is used during the hydrolysis process in an amount of from 0.001 to 0.25% by weight and preferably of from 0.002 to 0.08% by weight based on the weight of the lower phase.

EXAMPLE 1

A flexible polyurethane foam was made by reacting 82 parts by weigh (pbw) of prepolymer 1, 18 pbw of prepolymer 2, 20 pbw of polyol 1, 1.5 pbw of polyol 2, 0.65 pbw of a dimethylimidazole/water mixture (4/1, w/w) and 3.4 pbw of water.

987 kg of this foam was pelletized to pellets having a diameter of about 3 to 5 mm. The pellets so obtained were added to 1056 kg of stirred diethylene glycol, which was preheated at 180° C. and which contained 0.5 kg of an aqueous solution of KOH (50/50, w/w). The mixture was kept under a $N_2$ blanket. Then the temperature was raised to 200° C. and the mixture was allowed to react for 2 hours. Then stirring was stopped and the mixture was allowed to phase separate while being cooled to 90° C. in 12.5 hours. The upper and lower layer were collected. To 3.675 kg of this layer which contained 0.02% by weight of KOH, water was added at a rate of 60 ml/hr for 5 hours whilst maintaining a temperature of 210° C. under a $N_2$ blanket while stirring at atmospheric pressure. After water addition the reaction mixture was concentrated by removing diethylene glycol by distillation at 180° C. under less than 5 mbar pressure and a $N_2$ sparge while continuously stirring (remaining water was distilled off as well).

After two hours 34% w of used DEG remained, leaving 2.5 kg of concentrated mixture in the reactor.

The mixture so obtained was propoxylated so as to obtain a polyol mixture having an OH value of 506 mg KOH/g and a viscosity at 25° C. of 185 Pa.s.

The polyol mixture was used to prepare a rigid polyurethane foam having a density of 26.9 kg/m³.

EXAMPLE 2

95 pbw of prepolymer 1 (made from 23.75 pbw of MDI and 71.25 pbw of polyol 1), 5 pbw of prepolymer 2 (made from 4.9 pbw of polymeric MDI 1 and 0.1 pbw of polyol 3); 0.2 pbw of a diethanolamine/water mixture (9/1, w/w), 0.7 pbw of a DABCO/Niax mixture (3/2, w/w), 2.6 pbw of water and 90 pbw of polyol 1 were reacted to prepare a flexible polyurethane foam. The foam was pelletized to pellets having a diameter of about 3 to 5 mm.

2 kg of the pellets so obtained were added to 3 kg of stirred diethylene glycol, which was preheated at 180° C. and which contained 1 g of potassium hydroxide. The mixture was kept under a $N_2$ blanket. Then the temperature was raised to 260° C. and the mixture was allowed to react for 2 hours. Then the temperature was raised to 210° C. and water was added via a dip pipe at a rate of 1 ml/min for 5 hours whilst maintaining a temperature of 205° to 210° C. The stirring was then stopped and the mixture was allowed to phase separate while being allowed to cool to room temperature overnight. The upper and lower layer were collected. The lower phase was concentrated by removing diethylene glycol by distillation at 180° C. under less than 5 mbar pressure and a $N_2$ sparge while continuously stirring (remaining water was distilled off as well).

EXAMPLE 3

88 pbw of prepolymer 1, 15 pbw of prepolymer 2, 0.5 pbw of polyol 2, 0.56 pbw of dimethylimidazole and 2.15 pbw of water were reacted to prepare a flexible polyurethane foam. The foam was pelletized to pellets having a diameter of about 3 to 5 mm.

800 g of the foam pellets so obtained were added to a stirred solution of 0.8 g of potassium hydroxide in 1200 g of diethylene glycol and 40 g of water at room temperature. The mixture was kept under a $N_2$ blanket. Then the temperature was raised to 210° C. and the mixture was allowed to react for 6 hours. During that time the pressure raised to 3.8 bars. Then stirring was stopped and the mixture was allowed to phase separate while being allowed to cool to room temperature overnight. The upper and lower layer were collected. The lower phase was concentrated by removing diethylene glycol by distillation at 180° C. under less than 5 mbar pressure and a $N_2$ sparge while continuously stirring (remaining water was distilled as well).

Explanation of Ingredients Used in the Examples

Prepolymer 1: Prepolymer prepared by reacting 25 pbw of MDI and 75 pbw of an EO/PO polyol having a nominal functionality of 3, a molecular weight of about 6000 and having 15% by weight EO (all tip) (=polyol 1).

Prepolymer 2: Prepolymer prepared by reacting 13.9 pbw of polymeric MDI having an isocyanate functionality of 2.7 and an NCO value of 30.7% by weight (polymeric MDI 1) and 0.6 pbw of a trifunctional EO/PO polyol having 75% by weight randomly distributed oxyethylene units and a molecular weight of about 4000 (polyol 3).

Polyol 1: See above.

Polyol 2: Polyoxyethylene polyol having nominal functionality of 3 and a molecular weight of about 1200.

Polyol 3: See above.

DABCO: DABCO 33 LV; catalyst from Sir Products; DABCO is a trademark.

Niax A1: Niax A1; catalyst from Osi; Niax is a trademark.

We claim:

1. Process for alcoholizing and hydrolysing a flexible polyurethane foam by bringing a flexible polyurethane foam in contact with an alcoholizing polyol, allowing the foam and the polyol to react in the presence of a catalyst which enhances alcoholysis and hydrolysis of the foam in an amount of 0.001 to 0.25 and preferably 0.001 to 0.08% by weight based on the weight of the foam, then allowing the mixture to separate in an upper phase and a lower phase and collecting these phases in separate containers, wherein the hydrolysis is conducted by adding water and allowing the mixture to react with the water after the foam has been combined with the polyol and before the mixture is allowed to separate.

2. Process for hydrolysing a hydrolysable composition, which is obtained by 1) alcoholizing a flexible polyurethane foam by bringing the foam in contact with an alcoholizing polyol, preferably selected from glycerol and an oxyethylene polyol having a molecular weight of 62-500 and mixtures thereof, 2) allowing the foam and the polyol to react, 3) then allowing the mixture to separate in an upper and a lower phase and 4) collecting the lower phase, wherein this lower phase, optionally after it has been subjected to purification so as to reduce the amount of alcoholizing polyol, is subjected to hydrolysis by reacting it with water in the presence of a catalyst, which enhances the hydrolysis process, in an amount of 0.001 to 5% by weight based on the weight of the lower phase.

3. Process for recycling flexible polyurethane foams by 1) alcoholizing a flexible polyurethane foam by bringing the foam in contact with an alcoholizing polyol, preferably selected from glycerol and an oxyethylene polyol having a molecular weight of 62-500 and mixtures thereof, allowing the foam and the polyol to react in the presence of a catalyst, which enhances the alcoholysis process and the later hydrolysis process, in an amount of 0.001 to 5% by weight based on the weight of the foam, then allowing the mixture to separate in an upper and a lower phase and subsequently collecting the lower phase and 2) hydrolysing this lower phase by reacting it with water, optionally after it has been subjected to purification so as to reduce the amount of alcoholizing polyol,.

4. Process according to claim 1 wherein water is added gradually.

5. Process according to claim 1 wherein the hydrolysed lower phase is subjected to purification so as to reduce the content of alcoholizing polyol and to alkoxylation.

6. Process according to claim 2 where the water is added gradually.

7. Process according to claim 3 where the water is added gradually.

8. Process according to claim 2 wherein the hydrolyzed lower phase is subjected to purification so as to reduce the content of alcoholizing polyol and to alkoxylation.

9. Process according to claim 3 wherein the hydrolyzed lower phase is subjected to purification so as to reduce the content of alcoholizing polyol and to alkoxylation.

* * * * *